United States Patent
Taketani et al.

(10) Patent No.: US 11,977,228 B2
(45) Date of Patent: May 7, 2024

(54) IMAGE DISPLAY APPARATUS

(71) Applicant: CANON KABUSHIKI KAISHA, Tokyo (JP)

(72) Inventors: Akihito Taketani, Tokyo (JP); Masakazu Tohara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 17/159,378

(22) Filed: Jan. 27, 2021

(65) Prior Publication Data
US 2021/0231957 A1  Jul. 29, 2021

(30) Foreign Application Priority Data
Jan. 28, 2020  (JP) .................................. 2020-011935

(51) Int. Cl.
| | |
|---|---|
| *G02B 27/01* | (2006.01) |
| *G02B 3/00* | (2006.01) |
| *G02B 25/00* | (2006.01) |
| *G02B 27/28* | (2006.01) |
| *G06T 11/00* | (2006.01) |

(52) U.S. Cl.
CPC ........... *G02B 27/0172* (2013.01); *G02B 3/00* (2013.01); *G02B 25/001* (2013.01); *G02B 27/283* (2013.01); *G06T 11/00* (2013.01); *G02B 2003/0093* (2013.01)

(58) Field of Classification Search
None
See application file for complete search history.

(56) References Cited

U.S. PATENT DOCUMENTS

| | | | | |
|---|---|---|---|---|
| 6,134,051 A * | 10/2000 | Hayakawa | ........... | G02B 17/086 |
| | | | | 359/640 |
| 6,320,607 B1 * | 11/2001 | Takasaki | .................. | G02B 7/09 |
| | | | | 348/180 |
| 11,092,789 B2 * | 8/2021 | Kim | ..................... | G02B 13/009 |
| 2014/0049681 A1 * | 2/2014 | Shimomura | ... | G02B 15/144109 |
| | | | | 359/683 |
| 2017/0269368 A1 * | 9/2017 | Yun | ..................... | G02B 27/0905 |

(Continued)

FOREIGN PATENT DOCUMENTS

| | | | | | |
|---|---|---|---|---|---|
| JP | 2001133725 | A * | 5/2001 | ........... | G02B 23/125 |
| JP | 3604979 | B2 | 12/2004 | | |

(Continued)

*Primary Examiner* — Jwalant Amin
(74) *Attorney, Agent, or Firm* — Carter, DeLuca & Farrell LLP

(57) ABSTRACT

The image display apparatus includes an image capturing optical system, an image sensor, a display element, and an ocular optical system. An optical axis of the image capturing optical system and an optical axis of the ocular optical system are located on a same straight line. An image capturing view angle of the image capturing optical system is larger than a display view angle of the ocular optical system. The display element is configured to display, of an image generated by using a signal from the image sensor, an area corresponding to the display view angle. When d represents a distance between a position of an entrance pupil of the image capturing optical system and a position of the exit pupil of the ocular optical system, the condition of 20 mm≤d≤60 mm is satisfied.

16 Claims, 4 Drawing Sheets

(56) References Cited

U.S. PATENT DOCUMENTS

| | | | |
|---|---|---|---|
| 2018/0088314 A1* | 3/2018 | Jhang | G02B 9/10 |
| 2019/0018255 A1* | 1/2019 | Qin | G02B 27/283 |
| 2019/0155037 A1* | 5/2019 | Matsumura | G02B 25/04 |
| 2020/0027201 A1* | 1/2020 | Chen | G06T 15/205 |
| 2020/0158953 A1 | 5/2020 | Tohara et al. | |
| 2020/0192079 A1 | 6/2020 | Tohara et al. | |

FOREIGN PATENT DOCUMENTS

| | | | |
|---|---|---|---|
| JP | 2008-070525 A | | 3/2008 |
| JP | 2008070525 A | * | 3/2008 |
| JP | 2017-524281 A | | 8/2017 |
| WO | 2015/179446 A1 | | 11/2015 |

* cited by examiner

IMAGE DISPLAY APPARATUS

BACKGROUND OF THE INVENTION

Field of the Invention

The present invention relates to an image display apparatus enabling an observer to observe a captured image with superimposing an image generated by a computer.

Description of the Related Art

A video see-through head-mounted display (HMD) as an image display apparatus seamlessly fuses real space and virtual space in real time to provide mixed reality (MR) and augmented reality (AR). This HMD captures, through an image capturing optical system and an image sensor, an external world image (optical image) observed by an observer from his/her pupil position (that is, an exit pupil position of an ocular optical system), and displays, on a display element, a captured image with superimposing computer graphics (CG) image. As a result, the observer can observe a display image through the ocular optical system.

In such an HMD, positional shift between the exit pupil position and an optical axis of the ocular optical system or between an entrance pupil position and an optical axis of the image capturing optical system gives the observer a feeling of strangeness in the displayed image. Japanese Patent No. 3604979 discloses an HMD in which optical axes of an image capturing optical system and an ocular optical system are coincided with each other, and their entrance pupil positions and exit pupil positions are adjusted so as to reduce a feeling of strangeness of an observer.

However, in the HMD disclosed in Japanese Patent No. 3604979, since a component exists outside an image capturing view angle and a display view angle, it is difficult to sufficiently miniaturize the HMD.

On the other hand, Japanese Patent Laid-Open No. 2017-524281 discloses a small HMD in which an image capturing unit is disposed on an opposite side of a display element. However, Japanese Patent Laid-Open No. 2017-524281 does not disclose any ocular optical system that forms an image of light (optical image) from the display element on an observer's eye, and it is unclear whether or not the HMD functions well.

SUMMARY OF THE INVENTION

The present invention provides a compact image display apparatus enabling an observer to observe an image obtained by image capturing with little feeling of strangeness.

The present invention provides as an aspect thereof an image display apparatus including an image capturing optical system, an image sensor configured to capture an object through the image capturing optical system, a display element configured to display an image, and an ocular optical system configured to introduce light from the display element to an observer. An optical axis of the image capturing optical system and an optical axis of the ocular optical system are located on a same straight line. An image capturing view angle of the image capturing optical system is larger than a display view angle of the ocular optical system. The display element is configured to display, of an image generated by using a signal from the image sensor, an area corresponding to the display view angle. When d represents a distance between a position of an entrance pupil of the image capturing optical system and a position of the exit pupil of the ocular optical system, the following condition is satisfied:

$$20 \text{ mm} \leq d \leq 60 \text{ mm}.$$

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 11

Figure 1:
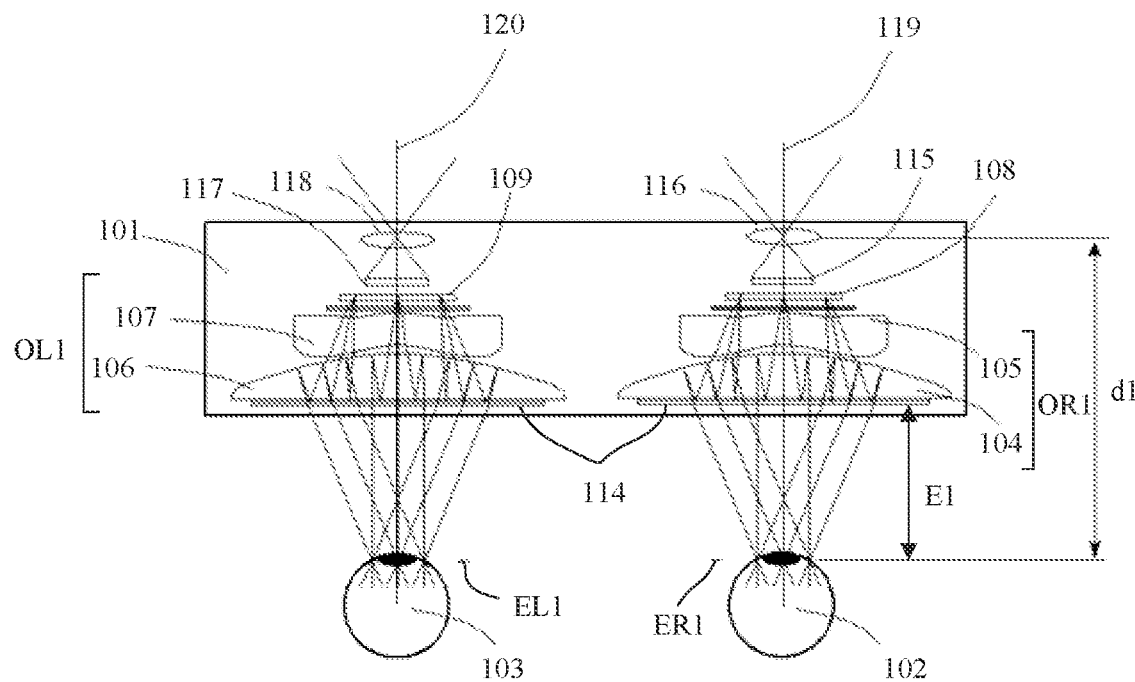
FIG. 1 is a sectional view of a configuration of an HMD of Embodiment 1.

FIG. 1 illustrates a configuration of a video see-through HMD 101 as an image display apparatus (image observation apparatus) that is a first embodiment (Embodiment 1) of the present invention. The HMD 101 is mounted (worn) on an observer's head. Reference numeral 102 denotes an observer's right eye, and reference numeral 103 denotes an observer's left eye. Display lenses 104 and 105 are included in a right-eye ocular optical system OR1, and display lenses 106 and 107 are included in a left-eye ocular optical system OL1. Each ocular optical system is a coaxial optical system including the two display lenses. The observer's right eye 102 is disposed at an exit pupil ER1 of the right-eye ocular optical system OR1, and the observer's left eye 103 is disposed at an exit pupil EL1 of the left-eye ocular optical system OL1.

Reference numeral 108 denotes a right-eye display element, and reference numeral 109 denotes a left-eye display element. Each display element is a flat plate display element. In this embodiment, an organic EL display panel is used as each display element. Reference numeral 115 denotes a right-eye image sensor, and reference numeral 116 denotes a right-eye image capturing optical system. Reference numeral 117 denotes a left-eye image sensor, and reference numeral 118 denotes a left-eye image capturing optical system. Each image sensor is constituted by a CCD sensor or a CMOS sensor. Each image capturing optical system is a coaxial optical system constituted by one or multiple image capturing lenses.

In the HMD 101 of this embodiment, optical images of an external world formed by the right-eye and left-eye image capturing optical systems 116 and 118 are captured (photoelectrically converted) by the right-eye and left-eye image sensors 115 and 117, and display images (original images) generated by using output signals from the right-eye and left-eye image sensors 115 and 117 are displayed on the right-eye and left-eye display elements 108 and 109. The right-eye and left-eye ocular optical systems OR1 and OL1 introduce lights from the right-eye and left-eye display elements 108 and 109 to the exit pupils ER1 and EL1 to project magnified virtual images of the display images onto the observer's right and left eyes 102 and 103. As a result, the observer can observe the virtual images of the display images displayed on the right-eye and left-eye display elements 108 and 109 through the right-eye and left-eye ocular optical systems OR1 and OL1.

In this embodiment, each image capturing optical system has a focal length of 2.5 mm, and each image sensor has an effective area whose diagonal length is 0.19 inches. Each image capturing optical system has a horizontal image capturing view angle of 71°, and a vertical image capturing view angle of 63°. Each ocular optical system has a focal length F1 of 12 mm, a horizontal display view angle of 45°, a vertical display view angle of 34°, and a diagonal display view angle of 54°. An eye relief E1 that is a distance between a most-exit pupil-side surface of each ocular optical system (that is, an exit pupil-side surface of a polarization beam splitter 114 described later) and the exit pupil of each ocular optical system (that is, the observer) is 18 mm. Each display element has an effective area whose diagonal length is 0.49 inches.

Figure 2:
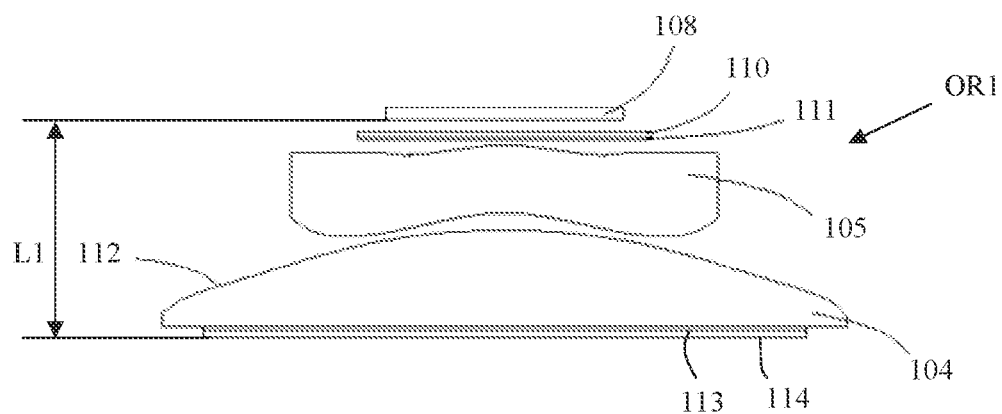
FIG. 2 is a sectional view of a configuration of an ocular optical system in Embodiment 1.

Each of the right-eye and left-eye ocular optical systems OR1 and OL1 in this embodiment is an optical system that folds an optical path by utilizing polarization of light. Description will hereinafter be made of a configuration of the right-eye ocular optical system OR1. The left-eye ocular optical system OL1 has the same configuration as that of the right-eye ocular optical system OR. As illustrated in FIG. 2, the right-eye ocular optical system OR1 includes, in order from the right-eye display element 108 toward the exit pupil ER1, a polarizing plate 110, a first λ/4 plate (first phase plate) 111, the display lens 105, the display lens 104, a second λ/4 plate (second phase plate) 113, and the polarization beam splitter (hereinafter referred to as "PBS") 114. On a display element-side convex surface of the display lens 104, a half mirror 112 as a semi-transmissive reflective surface is formed by vapor deposition. Further, the second λ/4 plate 113 and the PBS 114 are provided so as to be laminated on an exit pupil-side surface of the display lens 104.

The polarizing plate 110, the first λ/4 plate 111, the second λ/4 plate 113 and the PBS 114 are all formed in a flat plate shape. A polarization direction of a first linearly polarized light to be transmitted through the polarizing plate 110 is tilted with respect to a slow axis of the first λ/4 plate 111 by 45°. The polarization direction of the first linearly polarized light to be transmitted through the polarizing plate 110 is tilted with respect to a slow axis of the second λ/4 plate 113 by −45°. Further, the polarization direction of the first linearly polarized light to be transmitted through the polarizing plate 110 and a polarization direction of a second linearly polarized light to be transmitted through the PBS 114 are orthogonal to each other.

Non-polarized light emitted from the right-eye display element 108 is transmitted through the polarizing plate 110 to become linearly polarized light. The linearly polarized light is transmitted through the first λ/4 plate 111 to become circularly polarized light. The circularly polarized light is transmitted through the display lens 105, the half mirror 112 and the display lens 104, and then is transmitted through the second λ/4 plate 113 to become the first linearly polarized light.

This first linearly polarized light has the polarization direction orthogonal to the polarization direction to be transmitted through the PBS 114, and therefore is reflected by the PBS 114, and then is transmitted through the second λ/4 plate 113 to become circularly polarized light. This circularly polarized light is transmitted through the display lens 104, is reflected by the half mirror 112, is transmitted through the display lens 104 again, and then is transmitted through the second λ/4 plate 113 to become the second linearly polarized light. This second linearly polarized light has the polarization direction that coincides with the polarization direction to be transmitted through the PBS 114, and therefore is transmitted through the PBS 114 to be introduced to the exit pupil ER1 (right eye 102). Light emitted from the left-eye display element 109 is also introduced to the exit pupil EL1 (left eye 103) by the left-eye ocular optical system OL1.

Such a configuration in which each ocular optical system folds the optical path using polarization of light enables making each ocular optical system thin, and enables shortening the focal length of each ocular optical system so as to be able to observe a wide view angle image.

It is desirable that the focal length F1 of the ocular optical system satisfy the following condition:

$$5 \text{ mm} \leq F1 \leq 15 \text{ mm}.$$

As can be seen from FIG. 1, an optical axis of the right-eye image capturing optical system 116 and an optical axis of the right-eye ocular optical system OR1 are located on a same straight line 119 without being eccentric to each other. An optical axis of the left-eye image capturing optical system 117 and an optical axis of the left-eye ocular optical system OL1 are also located on a same straight line 120 without being eccentric to each other.

Since the optical axes of the image capturing optical system and the ocular optical system are located on the same straight line, a visual axis of the observer wearing the HMD coincides with a visual axis of the observer not wearing the HMD, so that image display can be made with little feeling of strangeness. Further, since the optical axes of the image capturing optical system and the ocular optical system are not eccentric to each other, a vertical height of the HMD can be reduced.

Moreover, since the display element and the image sensor are arranged close to each other on the straight line on which the above-described optical axes are located, an electric circuit board to which the display element and the image sensor are connected can be disposed without being separated in the HMD 101, so that the HMD 101 can be miniaturized.

In the video see-through HMD as in this embodiment, the image of the external world captured through the image capturing optical system is displayed on the display element to enable the observer to observe the image through the ocular optical system. Therefore, it is desirable that an entrance pupil position of the image capturing optical system and an exit pupil position of the ocular optical system be close to each other. If the entrance pupil position of the image capturing optical system and the exit pupil position of the ocular optical system are separated from each other, the observer wearing the HMD will observe the external world from the entrance pupil position of the image capturing optical system located frontward from the observer's eye, which increases a difference of the external world observed by the observer wearing the HMD from the external world observed by the observer not wearing the HMD, thereby causing a feeling of strangeness.

Accordingly, in this embodiment, the ocular optical system includes the two display lenses, and a thickness of the ocular optical system in a direction in which the optical axis extends (optical axis direction), that is, on the above-mentioned straight line is reduced to 13 mm. As described above, the length of 18 mm is secured as the eye relief E1 of the ocular optical system, and a distance (pupil shift amount) d1 between the entrance pupil position of the image capturing optical system and the exit pupil position of the ocular optical system is 35 mm. It is desirable that the distance d1 satisfy the following condition:

$$20 \text{ mm} \leq d1 \leq 60 \text{ mm}.$$

If the distance d1 is larger than 60 mm, the difference between the display image when the observer wears the HMD and the external world when the observer does not wear the HMD becomes large, which undesirably increases the feeling of strangeness. Moreover, it becomes necessary to significantly reduce the image capturing view angle of the image capturing optical system and the display view angle of the ocular optical system, which undesirably makes it impossible to observe a natural image.

On the other hand, if the distance d1 is smaller than 20 mm, the eye relief of the ocular optical system becomes about 5 mm that is too short, which undesirably gives the observer a feeling of tightness or makes it impossible for the observer wearing glasses to wear the HMD. It is more desirable that the distance d1 satisfy the following condition:

$$30 \text{ mm} \leq d1 \leq 50 \text{ mm}.$$

Further, in order to miniaturize the image capturing optical system and to reduce the distance d1, it is desirable that the image sensor have an effective area whose diagonal length is 0.4 inches or less. If the diagonal length of the effective area of the image sensor is larger than 0.4 inches, the image capturing optical system becomes large in accordance with this size, and the distance d1 becomes too large. Moreover, the HMD becomes large, and thereby the observer cannot observe comfortably. On the other hand, it is desirable that the display element have an effective area whose diagonal length is 0.4 inches or more. If the diagonal length of the effective area of the display element is smaller than 0.4 inches, the display view angle is too small, and thereby the observer cannot observe naturally.

Figure 3:
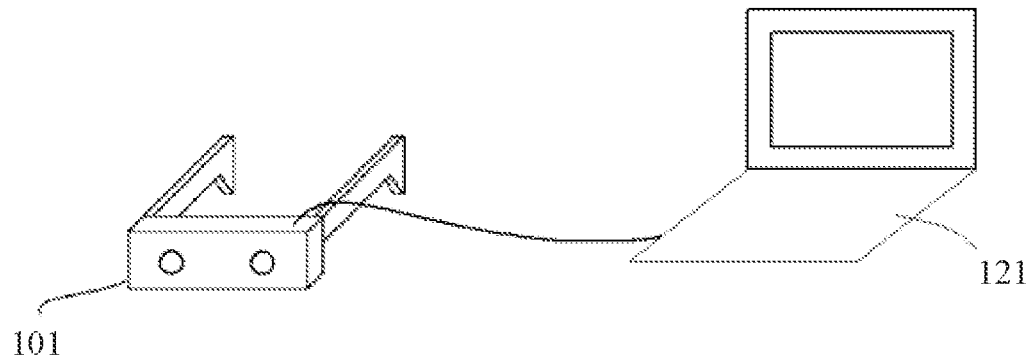
FIG. 3 is an external view of an image display system including the HMD of Embodiment 1.

FIG. 3 illustrates an external view of the HMD 101 and an external view of an image processing apparatus (personal computer) 121 that generates the display images to be displayed on the display elements 108 and 109 by using the output signals from the image sensors 115 and 117. It is desirable that the HMD 101 be lightweight because the observer wears it on his/her head. Therefore, it is desirable that the display lenses constituting the ocular optical system and the image capturing lenses constituting the image capturing optical system be made of a resin material having a specific gravity smaller than that of glass. Also in this embodiment, the display lenses 104 to 107 are resin lenses.

Further, in this embodiment, the display lenses 104 and 106 that are most-exit pupil-side lenses (that is, lenses closest to the observer) are each a plano-convex lens having a convex surface toward the display element, and the half mirror 112 is provided on the convex surface. This configuration realizes a wide view angle while thinning the ocular optical system. Moreover, the convex surfaces of the display lenses 104 and 106 each have an aspherical shape, which enhances their aberration correction effect. Furthermore, the display lenses 105 and 107 and the image capturing lenses 116 and 117 are each a resin-made double-sided aspherical lens, which enhances their aberration correction effect.

However, since the display lenses 105 and 107 have a small outer diameter, and therefore have a small influence on its weight, they may be each a glass lens. The glass lens has a very small birefringence, so that using the glass lens makes it possible to observe a high-quality image.

In this embodiment, the image capturing view angle of the image capturing optical system is larger than the display view angle of the ocular optical system. Therefore, the image processing apparatus 121 clips an image area corresponding to the display view angle from a captured image (external world image) generated by using the output signal from the image sensor to generate a display image, and displays this display image on the display element. The image capturing view angle larger than the display view angle makes it possible to relax alignment accuracy between the image capturing optical system and the image sensor.

Although FIG. 3 illustrates the case where the HMD 101 and the image processing apparatus 121 are separated from each other, an image processor serving as the image processing apparatus 121 may be provided inside the HMD 101.

Further, it is desirable that the eye relief be 15 mm or more so that the observer wearing glasses can wear the HMD 101. However, if it is assumed that the observer does not wear glasses, the eye relief may be 8 mm or more. On the other hand, if the eye relief is too long, the outer shape of the display lens becomes large, and thereby the HMD also becomes large. Therefore, it is desirable that the eye relief be 25 mm or less. That is, it is desirable that the eye relief E1 satisfy the following condition:

$$8 \text{ mm} \leq E1 \leq 25 \text{ mm}.$$

It is more desirable that the eye relief E1 satisfy the following condition:

$$15 \text{ mm} \leq E1 \leq 25 \text{ mm}.$$

As illustrated in FIG. 2, when a thickness L1 of the ocular optical system OR1 is defined as a distance from the exit pupil-side surface of the PBS 114 to a display surface of the display element 108, the thickness L1 is 13 mm as described above. The ratio L1/E1 of the thickness L1 and the eye relief E1 (=18 mm) is 0.72. It is desirable that, in order to provide an appropriate length of the eye relief and reduce the thickness of the ocular optical system, the ratio satisfy the following condition:

$$0.60 \leq L1/E1 \leq 1.40.$$

A value of L1/E1 smaller than 0.60 makes the eye relief too long and thus makes the outer diameter of the display lens large, which undesirably increases the size of the HMD 101. On the other hand, a value of L1/E1 larger than 1.40 makes the ocular optical system thick and thus increases the size of the HMD 101 large, and further makes the eye relief too short, which undesirably gives the observer a feeling of tightness or makes it impossible for an observer wearing glasses to wear the HMD 101.

Moreover, in this embodiment, a maximum diagonal half-view angle $\theta 1$ of the ocular optical system is 27°, and thus $E1 \times \tan \theta 1 = 9.2$ mm. It is desirable that, in order to provide an appropriate length of the eye relief and increase the display view angle of the ocular optical system, the value of $E1 \times \tan \theta 1$ satisfy the following condition:

$$8 \text{ mm} \leq E1 \times \tan \theta 1 \leq 20 \text{ mm}.$$

A value of E1×tan θ1 smaller than 8 mm makes the eye relief too short, which undesirably gives the observer a feeling of tightness or makes it impossible for the observer wearing glasses to wear the HMD 101. In addition, the value of E1×tan θ1 smaller than 8 mm makes the display view angle of the ocular optical system too narrow, which makes it impossible to observe a natural image with a sense of presence. On the other hand, a value of E1×tan θ1 larger than 20 mm makes the eye relief too long, and thus makes the outer diameter of the display lens large, which undesirably increases the size of the HMD 101.

Further, in order to reduce ghost light due to external light and increase contrast of the observed image, a polarizing plate may be disposed between the PBS 114 and the exit pupil position of each ocular optical system.

Moreover, in this embodiment, as illustrated in FIG. 2, the exit pupil-side surface of the display lens 104 formed so that the second λ/4 plate 113 and the PBS 114 are laminated is made as a flat surface. This is to secure a long eye relief and reduce the thickness of the ocular optical system. When this surface has a concave shape toward the exit pupil, the display lens 104 becomes thick in order to secure the eye relief in its peripheral portion. Further, when this surface has a convex shape toward the exit pupil, the display lens 104 becomes thick in order to secure a thickness of an edge portion of the display lens 104.

The desirable ranges of d1, E1, L1/E1, E1×tan θ1 and F1 described in this embodiment also apply to dn, En, Ln/En, En×tan θn and Fn (n=2, 3, 4) in Embodiments 2, 3 and 4 described later. Further, the desirable lens material and shape, sizes of the image sensor and the display element, and the like described in this embodiment also apply to those in Embodiments 2 to 4.

As the display element, a liquid crystal display panel that emits linearly polarized light may be used. In this case, the polarizing plate 110 can be omitted, and thereby the ocular optical system and the HND can be further thinned. Further, in this embodiment, the display element is disposed so that the center of its effective area (that is, the center of the display image) coincides with the optical axis of the ocular optical system. However, in order to add a convergence to the display image, the center of the display image may be shifted inward in a horizontal direction with respect to the optical axis of the ocular optical system. Even in this case, it is desirable that the optical axis of the image capturing optical system and the optical axis of the ocular optical system be arranged on a same straight line. The same applies to Embodiments 2 to 4.

Embodiment 2

Figure 4:
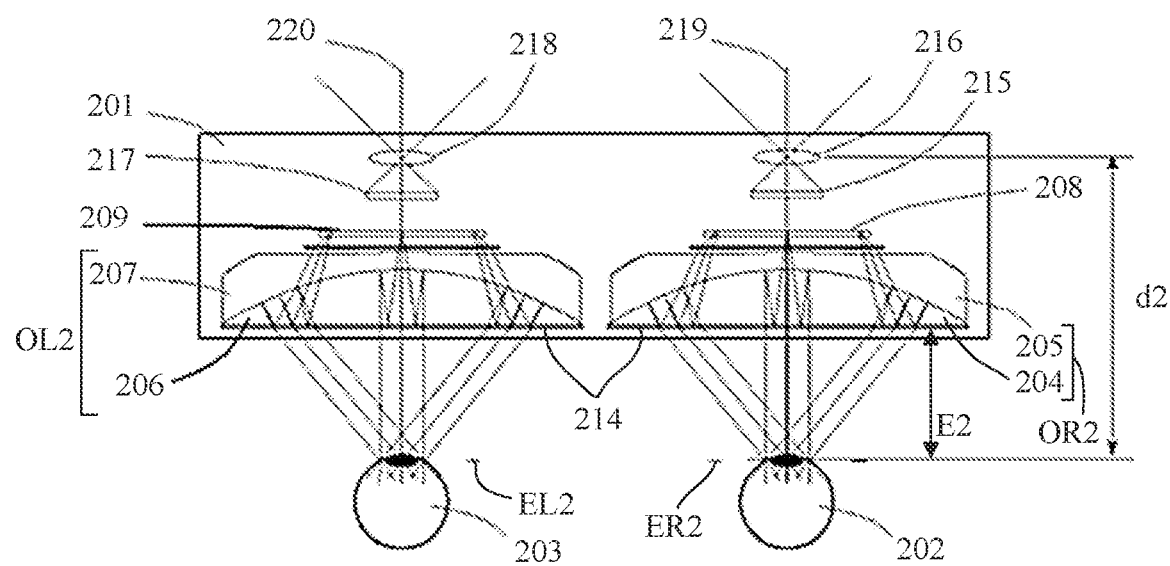
FIG. 4 is a sectional view of a configuration of the HMD of Embodiment 2.

FIG. 4 illustrates a configuration of a video see-through HMD 201 that is a second embodiment (Embodiment 2) of the present invention. Reference numeral 202 denotes an observer's right eye, and reference numeral 203 denotes an observer's left eye. Display lenses 204 and 205 are included in a right-eye ocular optical system OR2, and display lenses 206 and 207 are included in a left-eye ocular optical system OL2. Each ocular optical system is a coaxial optical system including the two display lenses. The observer's right eye 202 is disposed at an exit pupil ER2 of the right-eye ocular optical system OR2, and the observer's left eye 203 is disposed at an exit pupil EL2 of the left-eye ocular optical system OL2.

Reference numeral 208 denotes a right-eye display element, and reference numeral 209 denotes a left-eye display element. Each display element is a flat plate display element. In this embodiment, an organic EL display panel is used as each display element.

Reference numeral 215 denotes a right-eye image sensor, and reference numeral 216 denotes a right-eye image capturing optical system. Reference numeral 217 denotes a left-eye image sensor, and reference numeral 218 denotes a left-eye image capturing optical system. Each image sensor is constituted by a CCD sensor or a CMOS sensor. Each image capturing optical system is a coaxial optical system constituted by one or multiple image capturing lenses.

In the HMD 201 of this embodiment, as in Embodiment 1, optical images of an external world formed by the right-eye and left-eye image capturing optical systems 216 and 218 are captured (photoelectrically converted) by the right-eye and left-eye image sensors 215 and 217, and display images generated by using output signals from the right-eye and left-eye image sensors 215 and 217 are displayed on the right-eye and left-eye display elements 208 and 209. The right-eye and left-eye ocular optical systems OR2 and OL2 introduce lights from the right-eye and left-eye display elements 208 and 209 to the exit pupils ER1 and EL1 to project magnified virtual images of the display images onto the observer's right and left eyes 202 and 203. As a result, the observer can observe the virtual images of the display images displayed on the right-eye and left-eye display elements 208 and 209 through the right-eye and left-eye ocular optical systems OR2 and OL2.

In this embodiment, each image capturing optical system has a focal length of 2.5 mm, and each image sensor has an effective area whose diagonal length is 0.2 inches. Each image capturing optical system has a horizontal image capturing view angle of 77°, and a vertical image capturing view angle of 64°. Each ocular optical system has a focal length F2 of 13 mm, a horizontal display view angle of 60°, a vertical display view angle of 60°, and a diagonal display view angle of 78°. An eye relief E2 that is a distance between a most-exit pupil-side surface of each ocular optical system (that is, an exit pupil-side surface of a polarization beam splitter 214 described later) and the exit pupil of each ocular optical system is 20 mm. Each display element has an effective area whose diagonal length is 0.84 inches.

Figure 5:
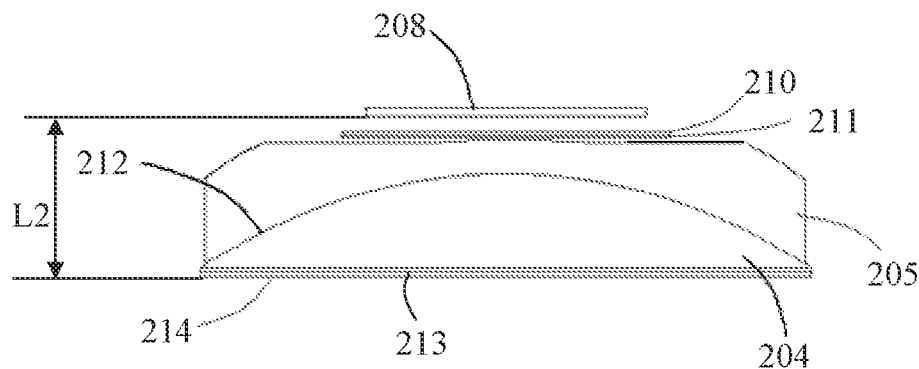
FIG. 5 is a sectional view of a configuration of an ocular optical system in Embodiment 2.

Each of the right-eye and left-eye ocular optical systems OR2 and OL2 in this embodiment is, as in Embodiment 1, an optical system that folds an optical path by utilizing polarization of light. Description will hereinafter be made of a configuration of the right-eye ocular optical system OR2. The left-eye ocular optical system OL2 has the same configuration as that of the right-eye ocular optical system OR2. As illustrated in FIG. 5, the right-eye ocular optical system OR2 includes, in order from the right-eye display element 208 toward the exit pupil ER2, a polarizing plate 210, a first λ/4 plate 211, the display lens 205, the display lens 204, a second λ/4 plate 213, and the polarization beam splitter (PBS) 214. On a display element-side surface of the display lens 204, a half mirror 212 as a semi-transmissive reflective surface is formed by vapor deposition. Further, the second λ/4 plate 213 and the PBS 214 are provided so as to be laminated on an exit pupil-side surface of the display lens 204.

The polarizing plate 210, the first λ/4 plate 211, the second λ/4 plate 213 and the PBS 214 are all formed in a flat plate shape. A polarization direction of a first linearly polarized light to be transmitted through the polarizing plate 210 is tilted with respect to a slow axis of the first λ/4 plate 211 by 45°. The polarization direction of the first linearly polarized light to be transmitted through the polarizing plate 210 is tilted with respect to a slow axis of the second λ/4 plate 213 by −45°. Further, the polarization direction of the first linearly polarized light to be transmitted through the polarizing plate 210 and a polarization direction of a second linearly polarized light to be transmitted through the PBS 214 are orthogonal to each other.

Non-polarized light emitted from the right-eye display element 208 is transmitted through the polarizing plate 210 to become linearly polarized light. The linearly polarized light is transmitted through the first λ/4 plate 211 to become circularly polarized light. The circularly polarized light is transmitted through the display lens 205, the half mirror 212 and the display lens 204, and then is transmitted through the second λ/4 plate 213 to become the first linearly polarized light.

This first linearly polarized light has the polarization direction orthogonal to the polarization direction to be transmitted through the PBS 214, and therefore is reflected by the PBS 214, and then is transmitted through the second λ/4 plate 213 to become circularly polarized light. This circularly polarized light is transmitted through the display lens 204, is reflected by the half mirror 212, is transmitted through the display lens 204 again, and then is transmitted through the second λ/4 plate 213 to become the second linearly polarized light. This second linearly polarized light has the polarization direction that coincides with the polarization direction to be transmitted through the PBS 214, and therefore is transmitted through the PBS 214 to be introduced to the exit pupil ER2 (right eye 202). Light emitted from the left-eye display element 209 is also introduced to the exit pupil EL2 (left eye 203) by the left-eye ocular optical system OL2.

Also in this embodiment, as in Embodiment 1, the configuration in which each ocular optical system folds the optical path using polarization of light enables making each ocular optical system thin, and enables shortening the focal length of each ocular optical system so as to be able to observe a wide view angle image.

As can be seen from FIG. 4, also in this embodiment, as in Embodiment 1, an optical axis of the right-eye image capturing optical system 216 and an optical axis of the right-eye ocular optical system OR2 are located on a same straight line 219 without being eccentric to each other. An optical axis of the left-eye image capturing optical system 217 and an optical axis of the left-eye ocular optical system OL2 are also located on a same straight line 220 without being eccentric to each other. Further, the display element and the image sensor are arranged close to each other on the straight line on which the optical axes are located.

In this embodiment, the two display lenses constituting the ocular optical system are cemented to each other, and a thickness of the ocular optical system in its optical axis direction is reduced to 13.5 mm. As described above, the eye relief E2 of the ocular optical system is set to 20 mm, and a distance d2 between an entrance pupil position of the image capturing optical system and an exit pupil position of the ocular optical system is set to 40 mm. Using the two display lenses as a cemented lens facilitates holding the display lenses by a main body of the HMD 201.

Also in this embodiment, the display lenses 204 to 207 are resin lenses, and the display lenses 204 to 207 are aspherical lenses, which enhances their aberration correction effect.

As illustrated in FIG. 5, when a thickness L2 of the ocular optical system is defined as a distance from the exit pupil-side surface of the PBS 214 to a display surface of the display element 208, the thickness L2 is 13.5 mm as described above. The ratio L2/E2 of the thickness L2 and the eye relief E2 (=20 mm) is 0.68.

Further, in this embodiment, a maximum diagonal half-view angle θ2 of the ocular optical system is 39°, and E2×tan θ2 is 16.2 mm.

Embodiment 3

Figure 6:
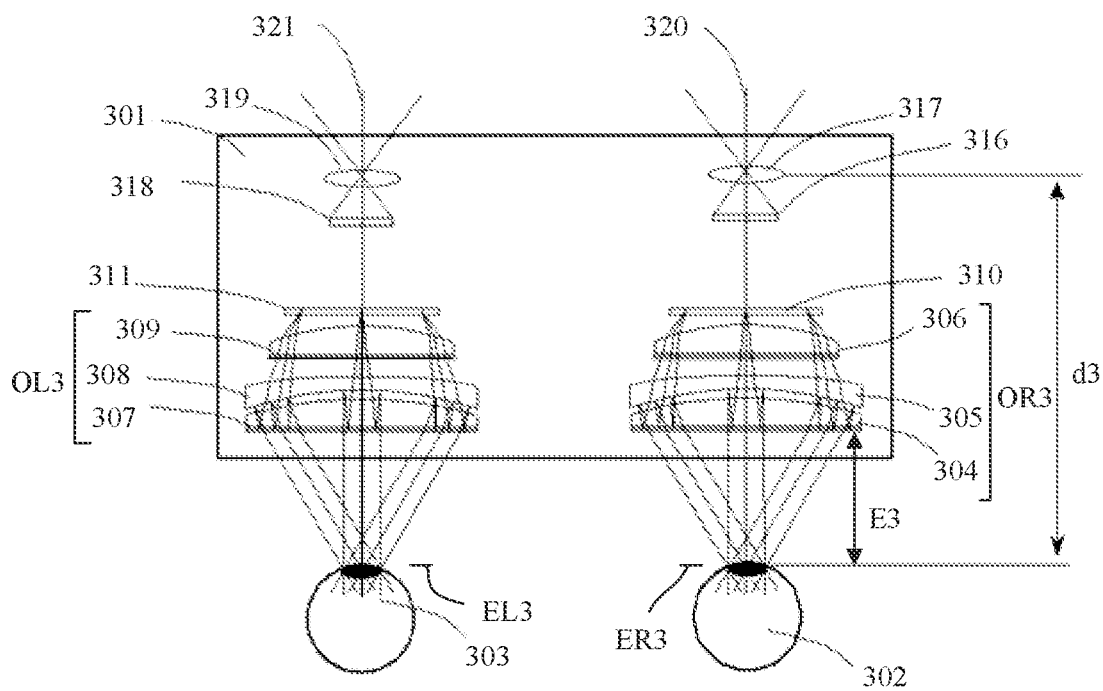
FIG. 6 is a sectional view of a configuration of an HMD of Embodiment 3.

FIG. 6 illustrates a configuration of a video see-through HMD 301 that is a third embodiment (Embodiment 3) of the present invention. Reference numeral 302 denotes an observer's right eye, and reference numeral 303 denotes an observer's left eye. Display lenses 304, 305 and 306 are included in a right-eye ocular optical system OR3, and display lenses 307, 308 and 309 are included in a left-eye ocular optical system OL3. Each ocular optical system is a coaxial optical system including the three display lenses. The observer's right eye 302 is disposed at an exit pupil ER3 of the right-eye ocular optical system OR3, and the observer's left eye 303 is disposed at an exit pupil EL3 of the left-eye ocular optical system OL3.

Reference numeral 310 denotes a right-eye display element, and reference numeral 311 denotes a left-eye display element. Each display element is a flat plate display element. In this embodiment, an organic EL display panel is used as each display element.

Reference numeral 316 denotes a right-eye image sensor, and reference numeral 317 denotes a right-eye image capturing optical system. Reference numeral 318 denotes a left-eye image sensor, and reference numeral 319 denotes a left-eye image capturing optical system. Each image sensor is constituted by a CCD sensor or a CMOS sensor. Each image capturing optical system is a coaxial optical system constituted by one or multiple image capturing lenses.

In the HMD 301 of this embodiment, optical images of an external world formed by the right-eye and left-eye image capturing optical systems 317 and 319 are captured (photo-electrically converted) by the right-eye and left-eye image sensors 316 and 318, and display images generated by using output signals from the right-eye and left-eye image sensors 316 and 318 are displayed on the right-eye and left-eye display elements 310 and 311. The right-eye and left-eye ocular optical systems OR3 and OL3 introduce lights from the right-eye and left-eye display elements 310 and 311 to the exit pupils ER3 and EL3 to project magnified virtual images of the display images onto the observer's right and left eyes 302 and 303. As a result, the observer can observe the virtual images of the display images displayed on the right-eye and left-eye display elements 310 and 311 through the right-eye and left-eye ocular optical systems OR3 and OL3.

In this embodiment, each image capturing optical system has a focal length of 6 mm, and each image sensor has an effective area whose diagonal length is 0.31 inches. Each image capturing optical system has a horizontal image capturing view angle of 56°, and a vertical image capturing view angle of 44°. Each ocular optical system has a focal length F3 of 10.7 mm, a horizontal display view angle of 50°, a vertical display view angle of 38°, and a diagonal display view angle of 60°. An eye relief E3 that is a distance between a most-exit pupil-side surface of each ocular optical system (that is, an exit pupil-side surface of a polarization beam splitter 316 described later) and the exit pupil of each ocular optical system is 15 mm. Each display element has an effective area whose diagonal length is 0.49 inches.

Figure 7:
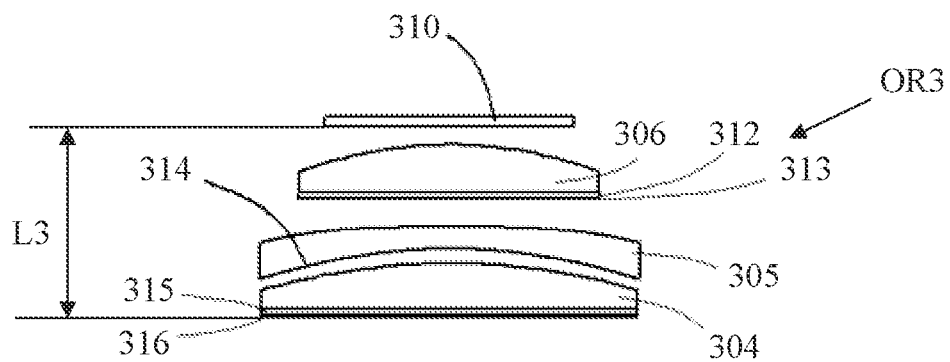
FIG. 7 is a sectional view of a configuration of an ocular optical system in Embodiment 3.

Each of the right-eye and left-eye ocular optical systems OR3 and OL3 in this embodiment is, as in Embodiment 1, an optical system that folds an optical path by utilizing polarization of light. Description will hereinafter be made of a configuration of the right-eye ocular optical system OR3. The left-eye ocular optical system OL3 has the same configuration as that of the right-eye ocular optical system OR3. As illustrated in FIG. 7, the right-eye ocular optical system OR3 includes, in order from the right-eye display element 310 toward the exit pupil ER3, the display lens 306, a polarizing plate 312, a first λ/4 plate 313, the display lens 305, the display lens 304, a second λ/4 plate 315, and the polarization beam splitter (PBS) 316. The polarizing plate 312 is fixed to a display element-side surface of the display lens 306. On an exit pupil-side surface of the display lens 305, a half mirror 314 as a semi-transmissive reflective surface is formed by vapor deposition. Further, the second λ/4 plate 315 and the PBS 316 are provided so as to be laminated on an exit pupil-side surface of the display lens 304.

The polarizing plate 312, the first λ/4 plate 313, the second λ/4 plate 315 and the PBS 316 are all formed in a flat plate shape. A polarization direction of a first linearly polarized light to be transmitted through the polarizing plate 312 is tilted with respect to a slow axis of the first λ/4 plate 313 by 45°. The polarization direction of the first linearly polarized light to be transmitted through the polarizing plate 312 is tilted with respect to a slow axis of the second λ/4 plate 315 by −45°. Further, the polarization direction of the first linearly polarized light to be transmitted through the polarizing plate 312 and a polarization direction of a second linearly polarized light to be transmitted through the PBS 316 are orthogonal to each other.

Non-polarized light emitted from the right-eye display element 310 is transmitted through the display lens 306, and then is transmitted through the polarizing plate 312 to become linearly polarized light. The linearly polarized light is transmitted through the first λ/4 plate 313 to become circularly polarized light. The circularly polarized light is transmitted through the display lens 305, the half mirror 314 and the display lens 304, and then is transmitted through the second λ/4 plate 315 to become the first linearly polarized light. This first linearly polarized light has the polarization direction orthogonal to the polarization direction to be transmitted through the PBS 316, and therefore is reflected by the PBS 316 and transmitted through the second λ4 plate 315 to become circularly polarized light.

This circularly polarized light is transmitted through the display lenses 304 and 305, is reflected by the half mirror 314, is transmitted through the display lenses 304 and 305 again, and then is transmitted through the second λ/4 plate 315 to become the second linearly polarized light. This second linearly polarized light has the polarization direction that coincides with the polarization direction to be transmitted through the PBS 316, and therefore is transmitted through the PBS 316 to be introduced to the exit pupil ER3 (right eye 302). Light emitted from the left-eye display element 311 is also introduced to the exit pupil EL3 (left eye 303) by the left-eye ocular optical system OL3.

Also in this embodiment, as in Embodiment 1, the configuration in which each ocular optical system folds the optical path using polarization of light enables making each ocular optical system thin, and enables shortening the focal length of each ocular optical system so as to be able to observe a wide view angle image.

As can be seen from FIG. 6, also in this embodiment, as in Embodiment 1, an optical axis of the right-eye image capturing optical system 317 and an optical axis of the right-eye ocular optical system OR3 are located on a same straight line 320 without being eccentric to each other. An optical axis of the left-eye image capturing optical system 319 and an optical axis of the left-eye ocular optical system OL3 are also located on a same straight line 321 without being eccentric to each other. Further, the display element and the image sensor are arranged close to each other on the straight line on which the optical axes are located.

In this embodiment, the ocular optical system includes the three display lenses, and a thickness of the ocular optical system in its optical axis direction is reduced to 18 mm. As described above, the eye relief E3 of the ocular optical system is set to 15 mm, and a distance d3 between an entrance pupil position of the image capturing optical system and an exit pupil position of the ocular optical system is set to 50 mm.

As illustrated in FIG. 7, when a thickness L3 of the ocular optical system is defined as a distance from the exit pupil-side surface of the PBS 316 to a display surface of the display element 310, the thickness L3 is 18 mm as described above. The ratio L3/E3 of the thickness L3 and the eye relief E3 (=15 mm) is 1.20.

Further, in this embodiment, a maximum diagonal half-view angle θ3 of the ocular optical system is 30°, and E3×tan θ3 is 8.7 mm.

Embodiment 41

Figure 8:
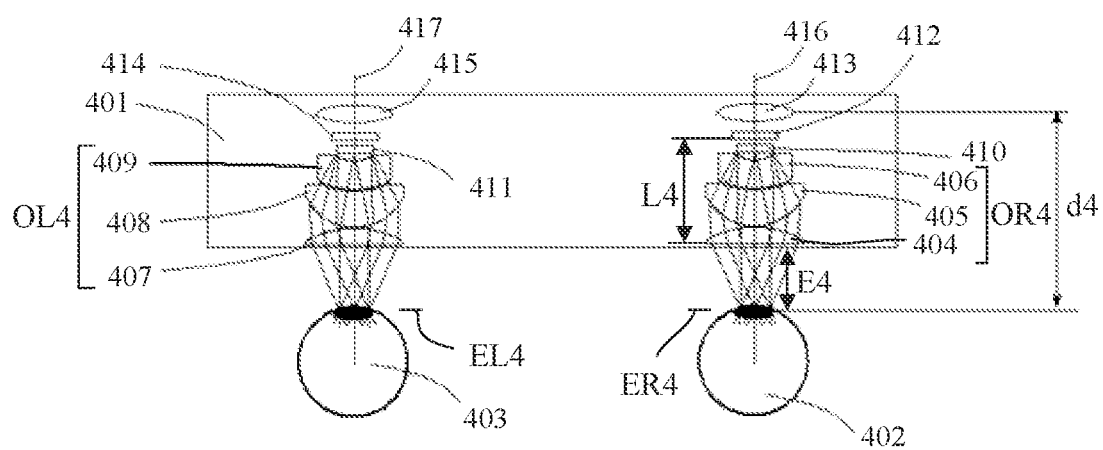
FIG. 8 is a sectional view of a configuration of an HMD of Embodiment 4.

FIG. 8 illustrates a configuration of a video see-through HMD 401 that is a fourth embodiment (Embodiment 4) of the present invention. Reference numeral 402 denotes an observer's right eye, and reference numeral 403 denotes an observer's left eye. Display lenses 404, 405 and 406 are included in a right-eye ocular optical system OR4, and display lenses 407, 408 and 409 are included in a left-eye ocular optical system OL4. Each ocular optical system is a coaxial optical system including the three display lenses. The observer's right eye 402 is disposed at an exit pupil ER4 of the right-eye ocular optical system OR4, and the observer's left eye 403 is disposed at an exit pupil EL4 of the left-eye ocular optical system OL4.

Reference numeral 410 denotes a right-eye display element, and reference numeral 411 denotes a left-eye display element. Each display element is a flat plate display element. In this embodiment, an organic EL display panel or a liquid crystal display panel is used as each display element.

Reference numeral 412 denotes a right-eye image sensor, and reference numeral 413 denotes a right-eye image capturing optical system. Reference numeral 414 denotes a left-eye image sensor, and reference numeral 415 denotes a left-eye image capturing optical system. Each image sensor is constituted by a CCD sensor or a CMOS sensor. Each image capturing optical system is a coaxial optical system constituted by one or multiple image capturing lenses.

In the HMD 401 of this embodiment, optical images of an external world formed by the right-eye and left-eye image capturing optical systems 413 and 415 are captured (photoelectrically converted) by the right-eye and left-eye image sensors 412 and 414, and display images generated by using output signals from the right-eye and left-eye image sensors 412 and 414 are displayed on the right-eye and left-eye display elements 410 and 411. The right-eye and left-eye ocular optical systems OR4 and OL4 introduce lights from the right-eye and left-eye display elements 410 and 411 to the exit pupils ER4 and EL4 to project magnified virtual images of the display images onto the observer's right and left eyes 402 and 403. As a result, the observer can observe the virtual images of the display images displayed on the right-eye and left-eye display elements 410 and 411 through the right-eye and left-eye ocular optical systems OR4 and OL4.

In this embodiment, each image capturing optical system has a focal length of 2.7 mm, and each image sensor has an effective area whose diagonal length is 0.16 inches. Each image capturing optical system has a horizontal image capturing view angle of 67°, and a vertical image capturing view angle of 41°. Each ocular optical system has a focal length F4 of 7 mm, a horizontal display view angle of 45°, a vertical display view angle of 35°, and a diagonal display view angle of 55°. An eye relief E4 that is a distance between a most-exit pupil-side surface of each ocular optical system (that is, exit pupil-side surfaces of the display lenses 404 and 407) and the exit pupil of each ocular optical system is 9 mm. Each display element has an effective area whose diagonal length is 0.29 inches.

Light emitted from the right-eye display element 410 is transmitted through the display lenses 406, 405 and 404 of the right-eye ocular optical system OR4 to be introduced to the exit pupil ER4 (right eye 402). Light emitted from the left-eye display element 411 is similarly transmitted through the left-eye ocular optical system OL4 to be introduced to the exit pupil EL4 (left eye 403).

As can be seen from FIG. 8, also in this embodiment, as in Embodiment 1, an optical axis of the right-eye image capturing optical system 413 and an optical axis of the right-eye ocular optical system OR4 are located on a same straight line 416 without being eccentric to each other. An optical axis of the left-eye image capturing optical system 415 and an optical axis of the left-eye ocular optical system OL4 are also located on a same straight line 417 without being eccentric to each other. Further, the display element and the image sensor are arranged close to each other on the straight line on which the optical axes are located.

In this embodiment, the ocular optical system includes the three display lenses, and a thickness of the ocular optical system in its optical axis direction is reduced to 12 mm. As described above, the eye relief E4 of the ocular optical system is set to 9 mm, and a distance d4 between an entrance pupil position of the image capturing optical system and an exit pupil position of the ocular optical system is set to 25 mm.

When a thickness L4 of the ocular optical system is defined as a distance from the exit pupil-side surface of the display lenses 404 and 407 to display surfaces of the display elements 410 and 411, the thickness L4 is 12 mm as described above. The ratio L4/E4 of the thickness L4 and the eye relief E4 (=9 mm) is 1.33.

Each of the above-described embodiments can provide a compact video see-through HMD that enables observing the display image obtained by image capturing with little feeling of strangeness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-011935, filed on Jan. 28, 2020 which is hereby incorporated by reference herein in its entirety.

What is claimed is:

1. An image display apparatus comprising:
   an image capturing optical system;
   an image sensor configured to capture an object through the image capturing optical system;
   a display element configured to display an image; and
   an ocular optical system configured to introduce light from the display element to an observer,
   wherein:
   an image capturing view angle determined by the image capturing optical system and the image sensor is larger than a display view angle determined by the ocular optical system and the display element;
   the display element is configured to display an area corresponding to the display view angle, the area being a part of an image corresponding to the image capturing view angle generated by using a signal from the image sensor;
   an optical axis of the image capturing optical system and an optical axis of the ocular optical system are located on a same straight line;
   the image capturing optical system, the image sensor, the display element, the ocular optical system, and an eye of the observer are arranged on the straight line in order from a side of the object;
   the ocular optical system includes, in order from a side of an exit pupil of the ocular optical system to a side of the display element, a first lens and a second lens;
   the first lens has a positive refractive power;
   the second lens has a surface of an aspherical shape on the side of the exit pupil or on the side of the display element; and
   when d represents a distance between a position of an entrance pupil of the image capturing optical system and a position of the exit pupil of the ocular optical system, the following inequality is satisfied:

$$20 \text{ mm} \leq d \leq 60 \text{ mm}.$$

2. The image display apparatus according to claim 1, wherein the ocular optical system includes three lenses or less.

3. The image display apparatus according to claim 1, wherein the image sensor has an effective area whose diagonal length is 0.4 inches or less.

4. The image display apparatus according to claim 1, wherein the display element has an effective area whose diagonal length is 0.4 inches or more.

5. The image display apparatus according to claim 1, wherein the image sensor and the display element are arranged on the straight line.

6. The image display apparatus according to claim 1, wherein the following inequality is satisfied:

$$8 \text{ mm} \leq E \leq 25 \text{ mm}.$$

7. The image display apparatus according to claim 1, wherein, the following inequality is satisfied:

$$8 \text{ mm} \leq E \leq 18 \text{ mm}.$$

8. The image display apparatus according to claim 1, wherein, when θ represents a maximum diagonal half-view angle of the ocular optical system, the following inequality is satisfied:

$$8 \text{ mm} \leq E \times \tan \theta \leq 20 \text{ mm}.$$

9. The image display apparatus according to claim 1, wherein, when F represents a focal length of the ocular optical system, the following inequality is satisfied:

$$5 \text{ mm} \leq F \leq 15 \text{ mm}.$$

10. The image display apparatus according to claim 1, wherein the first lens has a flat surface on the side of the exit pupil.

11. The image display apparatus according to claim 1, wherein the ocular optical system includes in order from the display element toward the exit pupil:
a first phase plate;
the second lens;
a semi-transmissive reflective surface;
the first lens;
a second phase plate; and
a polarization beam splitter configured to reflect a first linearly polarized light and transmit a second linearly polarized light whose polarization direction is orthogonal to that of the first linearly polarized light.

12. The image display apparatus according to claim 11, wherein the ocular optical system includes a polarizing plate disposed between the polarization beam splitter and the observer, and configured to transmit the second linearly polarized light.

13. The image display apparatus according to claim 11, wherein:
the display element is configured to emit non-polarized light; and
the ocular optical system includes a polarizing plate disposed between the display element and the first phase plate, and configured to transmit the first linearly polarized light.

14. The image display apparatus according to claim 1, wherein, in at least one of horizontal and vertical directions, the image capturing view angle and the display view angle have a difference of 5° or more.

15. The image display apparatus according to claim 1, wherein the first lens has a surface convex toward the side of the display element.

16. The image display apparatus according to claim 1, wherein when L represents a thickness of the ocular optical system on the straight line, and E represents an eye relief of the ocular optical system, the following inequality is satisfied:

$$0.60 \leq L/E \leq 1.40.$$

* * * * *